United States Patent

[11] 3,594,926

[72] Inventors Sydney C. Reed
3948 Edgewood Ave. North, Minneapolis, Minn. 55427;
Robert C. Shiely, Dellwood, Minn. 55110;
James R. Wagner, Jr., 1845 Park St., White Bear Lake, Minn. 55110
[21] Appl. No. 825,742
[22] Filed May 19, 1969
[45] Patented July 27, 1971

[54] APPARATUS AND METHOD FOR CORRELATING INFORMATION
11 Claims, 13 Drawing Figs.
[52] U.S. Cl. ................................................. 35/24 B, 40/32, 340/309.1
[51] Int. Cl. ........................................... G09b 29/06, G09f 11/16
[50] Field of Search .................................... 35/24, 24.2, 24.4; 40/32, 96, 96.5, 106.45; 340/309.1

[56] References Cited
UNITED STATES PATENTS
1,763,742 6/1930 Barker .......................... 40/32

| | | | |
|---|---|---|---|
| 2,412,238 | 12/1946 | Wassell ..................... | 35/24 (.4) |
| 2,589,812 | 3/1952 | Hoskins ..................... | 35/24 (.4) |
| 3,228,133 | 1/1966 | Baermann .................. | 35/7 A |
| 3,413,630 | 11/1968 | Mackinney ................. | 40/96 X |

Primary Examiner—Wm. H. Grieb
Attorney—Merchant & Gould

ABSTRACT: A plurality of endless belts formed of magnetic material driven at a constant speed with a portion of each readily viewable by an operator, magnetic visual indicators engageable and disengageable from said belts for representing information, areas encompassing portions of said belts and representative of phases of a task, such as "time to job," "time on job," and "time to return from job," and an adjustable elongated rod associated with each belt for indicating the time required in at least two of the phases. A second board is also utilized, similar to the above-described board, for indicating time intervals of a specific task, said boards providing a visual representation of interrelated information.

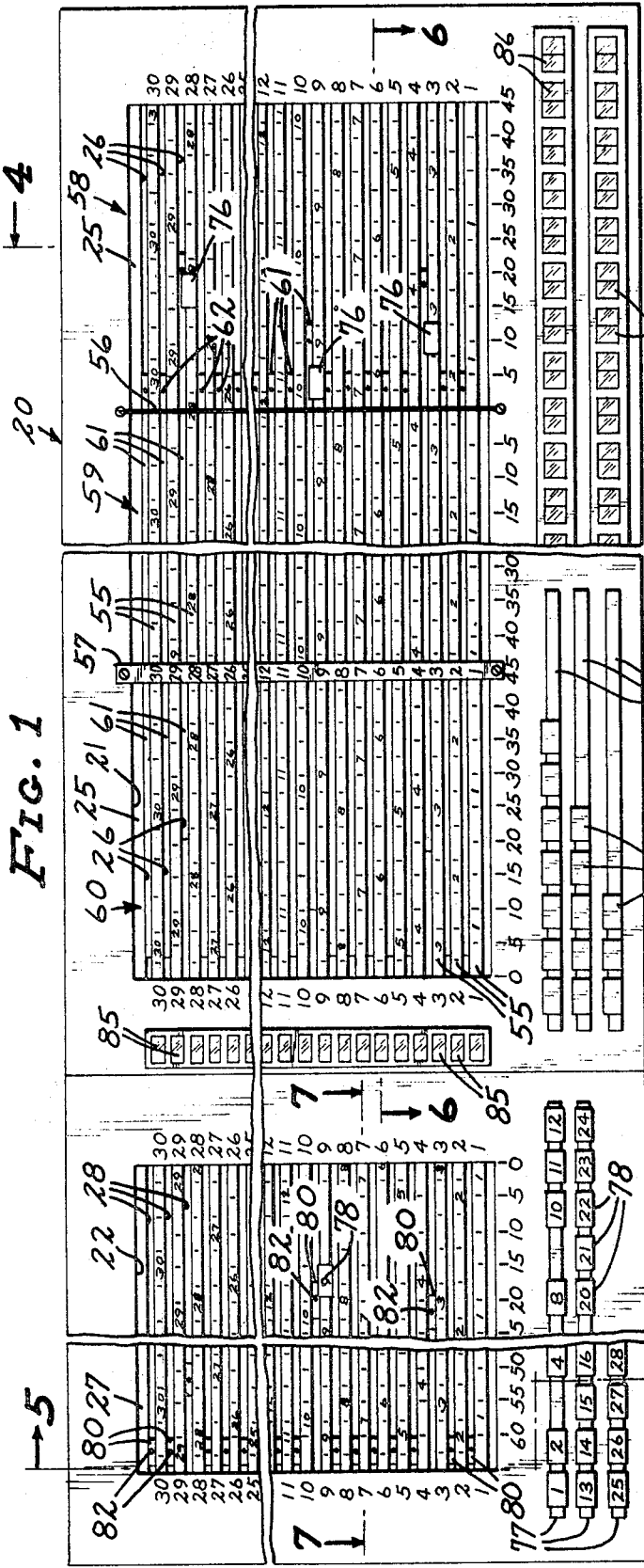

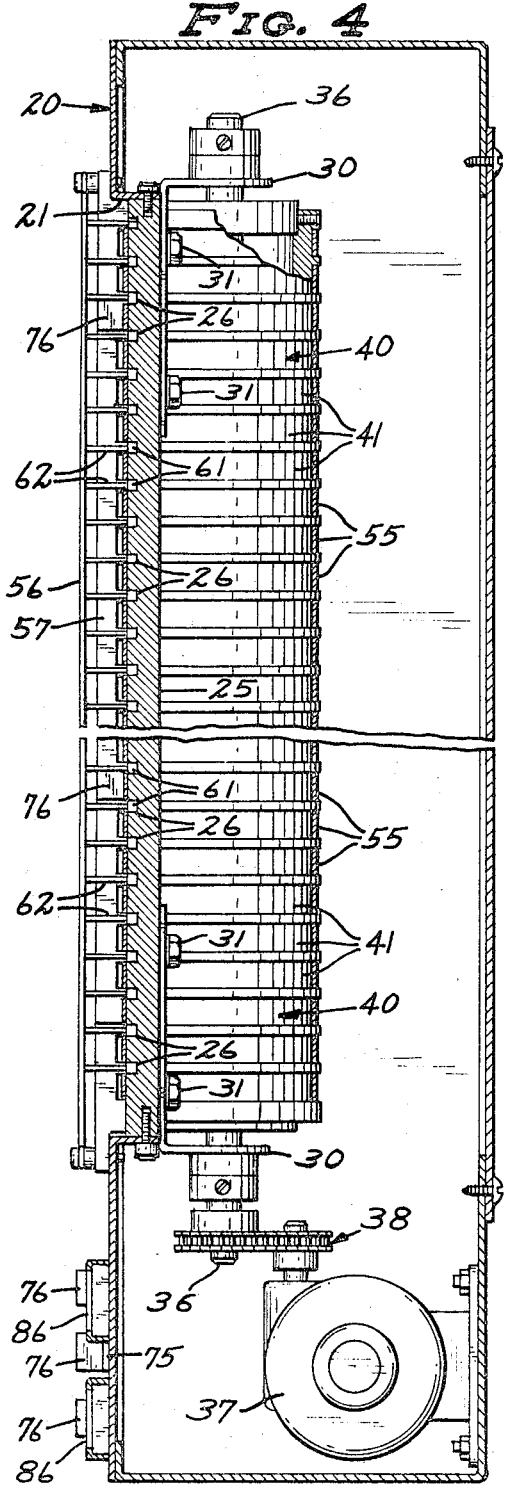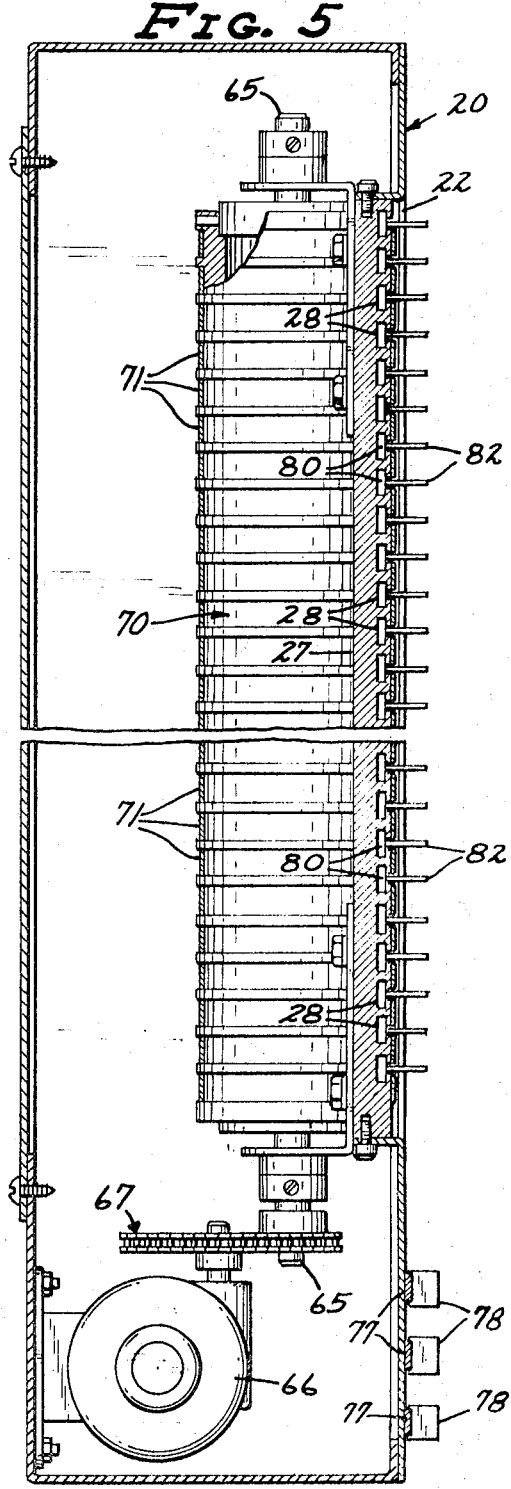

INVENTORS.
SYDNEY C. REED
ROBERT C. SHIELY
JAMES R. WAGNER, JR.
BY
Merchant & Gould
ATTORNEYS

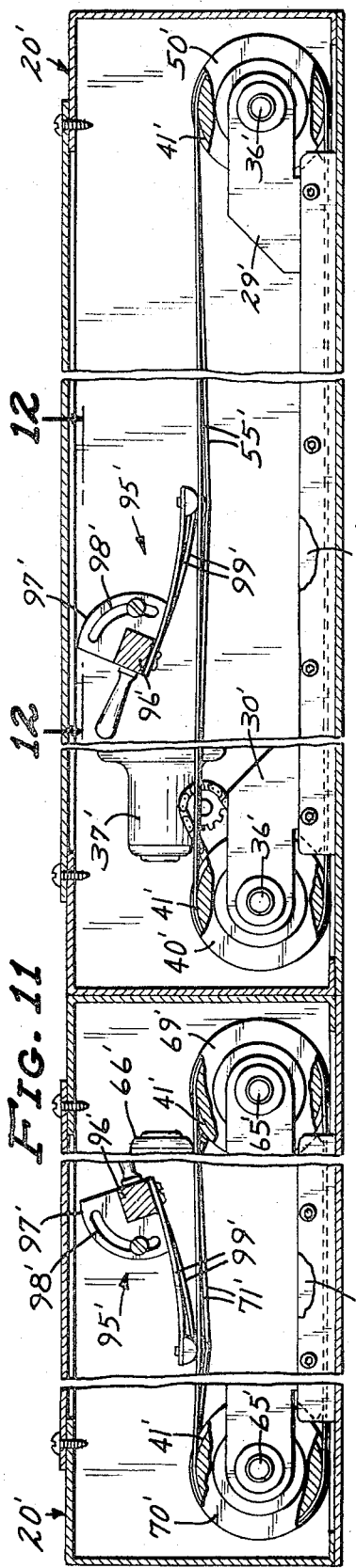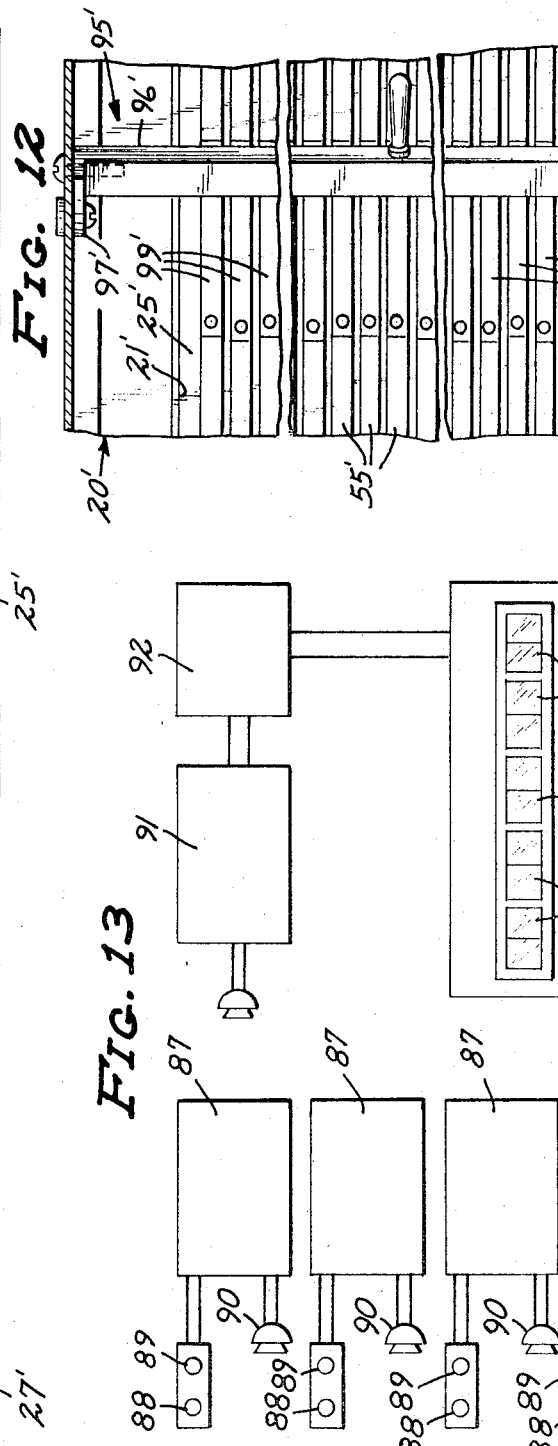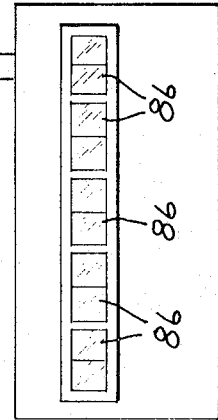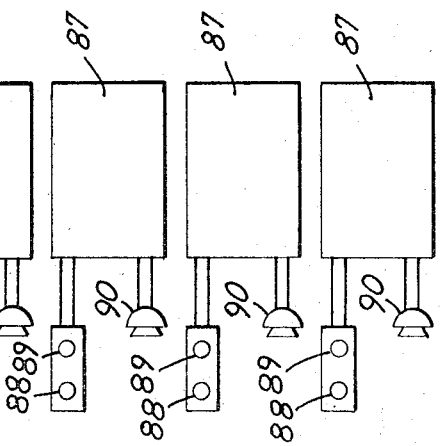

3,594,926

1

APPARATUS AND METHOD FOR CORRELATING INFORMATION

BACKGROUND OF THE INVENTION

1. Field of the Invention

Many large companies performing services and the like utilize a large number of pieces of equipment, such as trucks and the like, which are generally instructed in their movements by means of a central dispatcher. It is of course imperative that the company utilize all of the equipment to the utmost efficiency, which means reducing delays in dispatching and returning the pieces of equipment, preventing the collection of a plurality of pieces of equipment at a job requiring the repetitive return of pieces of equipment, etc. An example of the above is the dispatching of mixing trucks carrying premixed concrete, where times to the job and on the job are important because of the nature of the load as well as the efficient use of the equipment.

2. Description of the Prior Art

In the prior art dispatchers either maintain written records, updated periodically by means of radio communication or the like, or utilize various types of plotting boards. The written record type of dispatching is extremely unsatisfactory since equipment can collect at various points before the dispatcher realizes that a problem is pending. For example, several trucks could collect at a job with several more trucks already dispatched to the job before the dispatcher realizes that he has a slight miscalculation as to the proper interval between trucks.

The prior art plotting board also generally have many undesirable characteristics. One such board is formed of a magnetic material and has an endless belt formed of transparent plastic material moving at a constant rate thereover. Magnets representative of trucks or other pieces of equipment are placed on the board by the dispatcher to indicate the approximate positions of the various trucks or pieces of equipment. The movement of the magnets across the board represents the movement of the pieces of equipment through the phases of the job being performed. This board contains relatively inaccurate means for timing the interval between trucks or pieces of equipment and, because of the plastic belt moving between the magnets and the magnetic material, the magnets representing the pieces of equipment have a tendency to become displaced and provide inaccurate information.

SUMMARY OF THE INVENTION

The present invention pertains to apparatus for correlating information and presenting the correlation in a readily viewable form including at least one rotatably mounted endless belt formed of magnetic material with an elongated portion thereof readily viewable by an operator and driven at a substantially constant speed, magnetic visual indicators attachable to the viewable portion of said belt and adjustable means positioned adjacent the viewable portion of said belt for indicating the time required to complete various phases of a task.

BRIEF DESCRIPTION OF THE DRAWINGS

Referring to the drawings, wherein like characters indicate like parts throughout the figures:

FIG. 1 is an elevational view of a display board for correlating information, portions thereof broken away;

FIG. 2 is an enlarged fragmentary view of a portion of FIG. 1;

FIG. 3 is an enlarged fragmentary view of another portion of FIG. 1;

FIG. 4 is an enlarged sectional view as taken from the line 4-4 in FIG. 1, portions thereof broken away;

FIG. 5 is an enlarged sectional view as seen from the line 5-5 in FIG. 1, portions thereof broken away;

2

Figure 6:
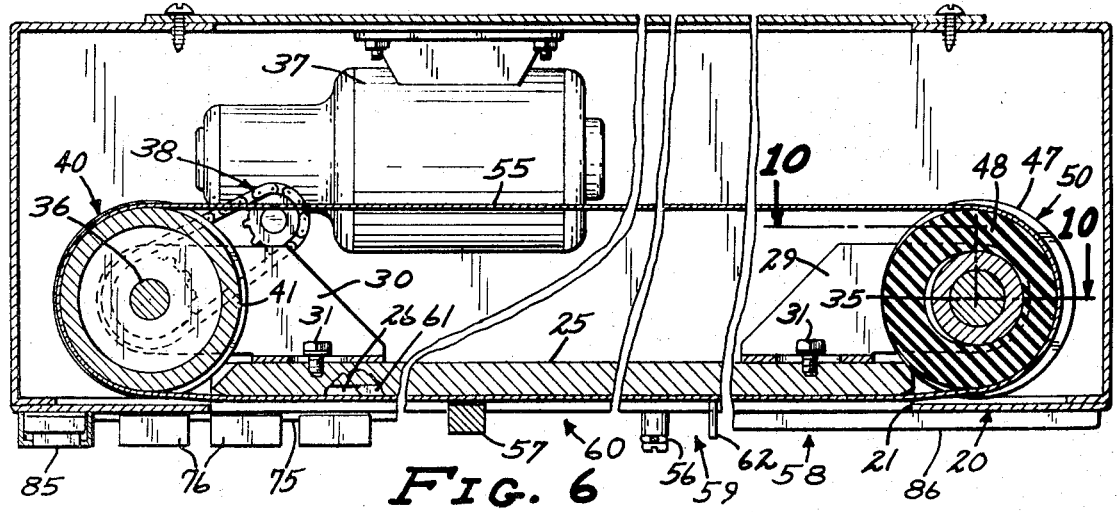
FIG. 6 is an enlarged sectional view as seen from the line 6-6 in FIG. 1, portions thereof broken away.
Figure 7:
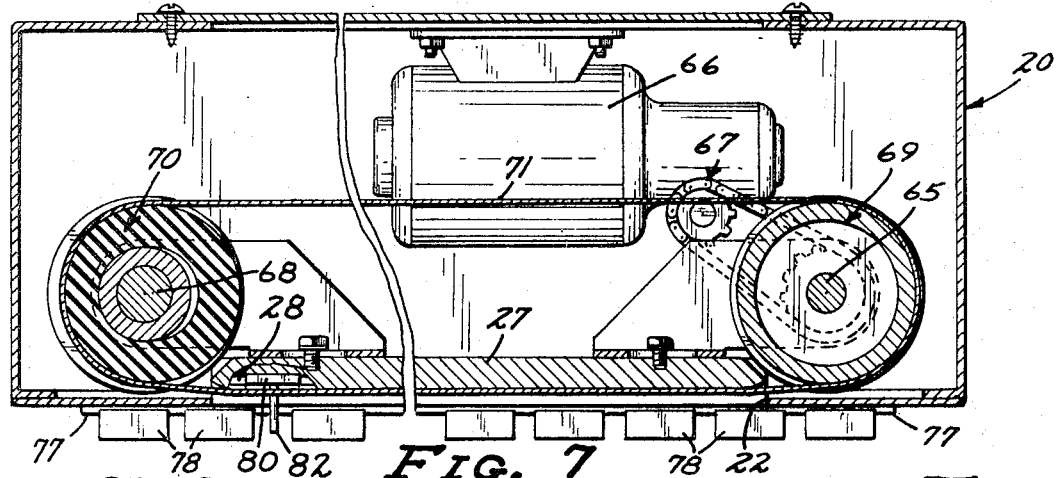
Figures 8, 9, 10:
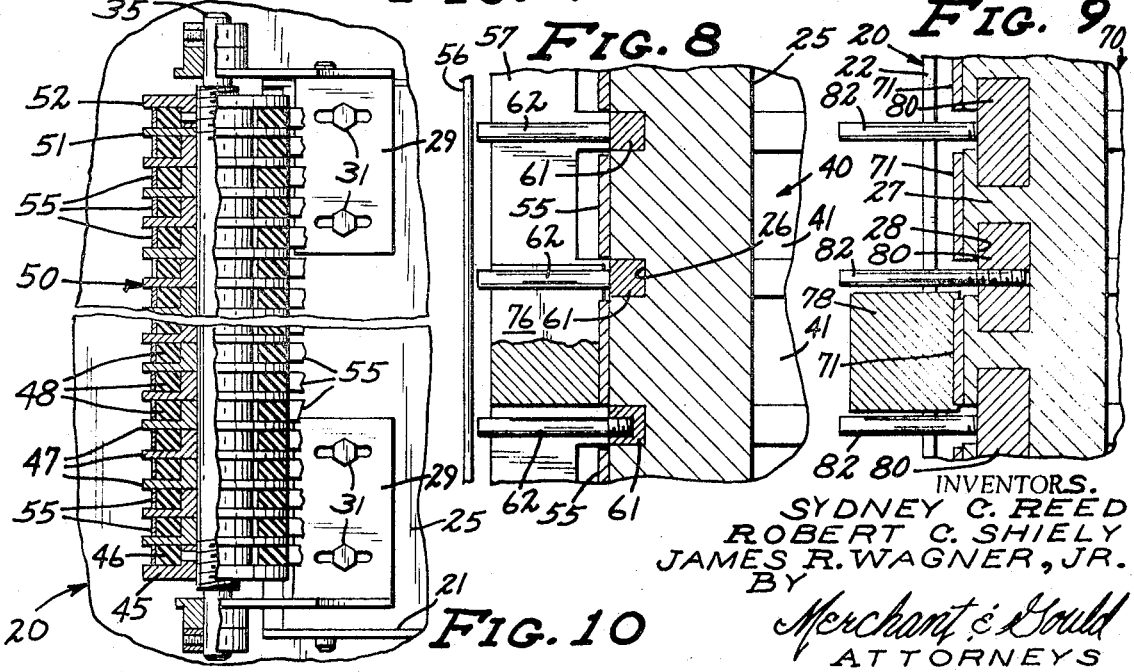

FIG. 7 is an enlarged sectional view as seen from the line 7-7 in FIG. 1, portions thereof broken away;

FIG. 8 is a sectional view as seen generally from the line 8-8 of FIG. 3;

FIG. 9 is a sectional view as seen from the line 9-9 of FIG. 2;

FIG. 10 is a sectional view as seen from the line 10-10 of FIG. 6, portions thereof broken away;

FIG. 11 is a horizontal sectional view of a different embodiment, portions thereof broken away;

FIG. 12 is a sectional view as seen from the line 12-12 in FIG. 11, portions thereof broken away; and FIG. 13 is a block diagram of electronic circuitry in an apparatus.

DESCRIPTION OF THE PREFERRED EMBODIMENT

In the figures the numeral 20 generally designates an elongated boxlike frame having a first elongated rectangular-shaped opening 21 and a second rectangular-shaped opening 22 in one side thereof. The side of the frame 20 having the openings 21 and 22 therein forms a display panel and is situated so that it is in a good viewing position for an operator. It should be understood that the frame 20 might be built into or form part of a wall, a desk, or other convenient piece of equipment to be utilized by a dispatcher or the like. Also, while the openings 21 and 22 are illustrated in a generally side-by-side relationship, it should be understood that they could be mounted in any convenient relationship so that information displayed thereby will be readily available to an operator.

The upper and lower edges of the opening 21 are turned to form inwardly directed flanges which are utilized to mount a faceplate 25. The faceplate 25 is generally rectangular in shape with dimensions approximately equal to the opening 21 and it is mounted within the opening 21 so as to leave transversely extending slotted openings between the faceplate 25 and the frame 20 at each end thereof. The faceplate 25 has a plurality of longitudinally extending, generally parallel channels 26 formed therein and spaced transversely apart approximately equal amounts over the width of the faceplate 25. The faceplate 25 is formed of some relatively rigid nonmagnetic material such as aluminum, plastic, etc. A faceplate 27 is similarly mounted behind the opening 22 in the frame 20. The faceplate 27 is similar to the faceplate 25 except that a plurality of channels 28 formed therein have T-shaped cross sections for reasons which will become apparent presently.

A pair of transversely spaced-apart brackets 29 are mounted at one end of the faceplate 25 and a second pair of similar brackets 30 are mounted in a transversely spaced-apart relationship at the other end of the faceplate 25. The brackets 29 and 30 are affixed to the rear side of the faceplate 25 by means of bolts 31 threadedly engaged into the faceplate 25 through slotted openings in the brackets 29 and 30. The slotted openings allow relative movements between the brackets 29 and 30 for assembly and alignment purposes. Each of the brackets 29 have axially aligned openings therethrough with an elongated shaft 35 rotatably mounted therein. Each of the brackets 30 have axially aligned openings therethrough with an elongated shaft 36 rotatably mounted therein. The shafts 35 and 36 extend transversely a distance somewhat greater than the width of the opening 21 and, through adjustment of the brackets 29 and 30, should be approximately parallel. The shaft 36 is driven by means of a synchronous motor 37 attached thereto through a sprocket and chain arrangement generally designated 38. It should be understood that the shaft 36 can be connected to the motor 37 by any convenient means and the motor 37 can also be any convenient device which will drive the shaft 36 at a constant rate.

The shaft 36 has an elongated roller 40 coaxially engaged thereon so as to extend approximately between the upper and lower sides of the opening 21. The roller 40 has a plurality of longitudinally spaced-apart grooves 41 therein each of which has a width approximately equal to the distance between the channels 26 in the faceplate 25 with the distance between the grooves 41 in the roller 40 approximately equal to the width of the channels 26 in the faceplate 25. Further, the roller 40 is mounted so that the grooves 41 therein are approximately aligned with the spaces between the channels 26 in the faceplate 25 and the front surface of the faceplate 25 is approximately tangent to the roller 40.

The shaft 35 has an enlarged threaded portion adjacent each end thereof positioned longitudinally inwardly from each of the brackets 29. A first internally threaded tubular spacer 45, having a radially outwardly extending flange adjacent the lower end thereof, is threadedly engaged on the shaft 35 adjacent the lower end thereof and a resilient washer 46, which may be relatively soft rubber or the like, is placed in coaxial overlying relationship thereon. A plurality of tubular spacers 47, each having a radially outwardly extending flange adjacent the lower end thereof and a resilient washer 48 in coaxial overlying relationship thereon, are stacked on the shaft 35 to form a roller generally designated 50. The spacers 47 are held in place by positioning a disc 51 over the shaft 35 adjacent the last spacer 47 and threadedly engaging a spacer 52, similar to spacer 45 but in a reverse position, onto the shaft 35. The washers 48 between the flanges of the spacers 47 have a diameter somewhat smaller than the flanges so that grooves are formed in the surface of the roller 50. The roller 50 is mounted so that the grooves therein are approximately aligned with the spaces between the channels 26 in the faceplate 25 and the faceplate 25 is approximately tangent to the outer diameter thereof.

A plurality of endless belts 55 extend between the roller 40 and the roller 50 so that each of the grooves 41 and counterpart washers 48 have an endless belt 55 in overlying engagement therewith. The endless belts extend across the opening 21 in sliding engagement with the front surface of the faceplate 25 between the channels 26. Thus, the portion of each of the endless belts 55 extending across the opening 21 in front of the faceplate 25 is readily viewable by the operator. The resilient washers 48 compensate for small differences in the lengths of the belts 55 so that all of the endless belts 55 are maintained taut and travel at the same constant speed. In the present embodiment the endless belts 55 are formed of a magnetic material, such as steel or the like, for purposes which will become apparent presently.

Each of the endless belts 55 are designated by consecutive numbers beginning with the lowermost belt and progressing upwardly therefrom. The numbers designating each of the belts are printed on the frame 20 adjacent each end of the belts. The synchronous motor 37 is attached to the shaft 36 so that the endless belts 55 are driven at approximately 1 inch per 5 minutes from right to left across the opening 21 in the present embodiment. The outwardly directed surface of each of the endless belts 55 have marks at 1-inch intervals, which marks may be formed by some convenient means such as electrical etching, painting, etc. In the present embodiment for convenience of identifying the endless belts 55 every fourth interval on the outwardly directed face of the belt 55 is represented by the number of the belt, rather than a simple mark.

A wire 56 is attached to the frame 20 so as to extend transversely across the opening 21. An elongated bar 57 having a plurality of transversely outwardly extending flanges which mate with the channels 26 in the faceplate 25, is affixed to the frame 20 so as to extend transversely across the opening 21 parallel with the wire 56 and the ends of the opening 21. The wire 56 and the bar 57 divide the opening 21 into three areas generally designated 58, 59 and 60. The area 58 is defined by the right end of the opening 21 and the wire 56, the area 59 is defined by the wire 56 and the bar 57, and the area 60 is defined by the left end of the opening 21 and the bar 57. The area 58 is divided into 1-inch or 5-minute increments with the wire 56 being designated "0" and the time increasing toward the right end of the opening 21. The area 59 is divided into 1-inch or 5-minute increments with the wire 56 being designated "0" and the time increasing toward the bar 57. The area 60 is divided into 1-inch or 5-minute increments with the left end of the opening 21 being designated "0" and the time increasing toward the bar 57. It should be understood that the present embodiment is designed for a specific operation and different operations utilizing different types, amounts, etc., of information will or may be different configurations.

Each of the channels 26 in the faceplate 25 has an elongated nonmagnetic bar 61 slidably engaged therein. The length of each of the bars 61 is slightly greater than the distance between the left end of the opening 21 and the wire 56, or the width of the areas 59 and 60. The bars 61 are held in the channels 26 by the bar 57. Each of the bars 61 has a peg 62 affixed thereto in outwardly extending relationship adjacent the right end thereof. The pegs 62 are utilized as handles to move the bars 61 in the channels 26 and are positioned on the bars 61 a distance from the left end equal to the distance between the left end of opening 21 and wire 56 to act as reference points, which will be explained presently. The bars 61 are constructed so that the pegs 62 will always be the same distance from the wire 56 in the area 58 as the left end of the bar 61 is from the left end of the opening 21 in the area 60.

The faceplate 27 mounted in the opening 22 has a shaft 65 driven by a synchronous motor 66 through a sprocket and chain arrangement 67, mounted at one end thereof and a shaft 68 mounted at the other end thereof. The shafts 65 and 68 are mounted similar to the shafts 35 and 36 described in conjunction with the opening 21. Also, the shaft 65 has a roller 69 thereon similar to roller 40 and the shaft 68 has a roller 70 thereon similar to roller 50. A plurality of endless belts 71 are engaged over the rollers 69 and 70 and the synchronous motor 66 drives the endless belt 71 across the opening 22 from left to right at a rate of approximately 1-inch per 5 minutes. The belts 71 are numbered consecutively from the bottom of the opening 22. In this embodiment there are an equal number of belts 55 and belts 71, although it should be understood that different numbers might be utilized if desired. The opening 22 is divided into 5-minute intervals with the right end of the opening 22 being designated "0." Each of the belts 71 are also divided into 5-minute or 1-inch intervals with a mark being placed at each interval and each fourth interval having the number of the belt placed thereon.

A plurality of magnetic strips 75 are affixed to the front surface of the frame 20 generally below the opening 21. The strips 75 are provided for storage of a plurality of magnetic visual indicators 76, each of which represents a piece of equipment, such as a concrete truck or the like. The visual indicators 76 are adapted to be affixed onto the endless belts 55 and, because the visual indicators 76 are magnets and the endless belts 55 are formed of magnetic material, the visual indicators can be placed substantially anywhere on an endless belt 55 and will travel with the endless belt 55 across the opening 21. Each of the visual indicators 76 has a longitudinally extending lip on the inwardly directed surface thereof which engages the upper edge of the endless belt 55 to further aid in preventing movement thereof relative to the endless belt 55. In addition, because of the lip, each of the visual indicators 76 extends transversely outwardly from the endless belt 55 sufficiently to engage the pin 62 on the adjacent bar 61. The wire 56 is spaced from the endless belts 55 sufficiently to allow the passage of visual indicators 76 therebelow but the bar 57 acts as a stop for the visual indicators 76.

Several magnetic strips 77 are attached to the front of the frame 20 below the opening 22 and a plurality of magnetic visual indicators 78 are affixed thereon during storage. The visual indicators 78 are adapted to be engaged on the endless belts 71 and operate in a fashion somewhat similar to the visual indicators 76. However, the visual indicators 78 each have a lip extending outwardly from the rear face thereof along either longitudinal edge so that the belts 71 are engaged therebetween to prevent relative movement between the individual visual indicators 78 and the engaged belts 71.

Each of the T-shaped channels 28 in the faceplate 27 has a relative short plastic, or other nonmagnetic, rod 80 positioned therein for sliding movements therealong. The rods 80 each have an adjustable friction locking pin 82 affixed therein so as to extend outwardly from the channels 28 to serve as a handle for moving the rods 80 and a reference point. The pins 82 are threadedly engaged in the rods 80, in this embodiment, and frictionally engage the bottoms of the channels 28 when they are tightened, to lock the rods 80 in a desired position. The visual indicators 78 are constructed so that they do not engage the pins 82 in the rods 80 as they travel with the belts 71.

A row of lights 85 is attached to the frame 20 generally between the openings 21 and 22. For convenience the lights 85 are the pushbutton type which are energized when the illuminated portion is depressed and are deenergized when the illuminated portion is depressed a second time. It should be understood that the lights 85 could be energized or deenergized remotely by toggle or lighted switch, or by any other desirable apparatus. Each of the lights 85 is sufficiently large to receive one of the visual indicators 76 thereon and has some magnetic material therein to retain the visual indicator 76 thereon.

A plurality of lights 86, each energizable in two parts, are mounted on the frame 20 generally below the opening 21. The number of lights 86 coincide with the number of visual indicators 76 and each is representative of one of the pieces of equipment, such as a concrete truck or the like. Referring specifically to FIG. 13, each piece of equipment has an electronic transceiver 87 mounted thereon with a pair of pushbuttons 88 and 89 and, optionally, a microphone 90. The transceiver 87 is constructed so that depressing the pushbutton 88 provides a first signal at the output thereof and depressing the pushbutton 89 provides a second signal at the output thereof. A transceiver 91 is associated with the present apparatus and is tuned to receive the signals from the various transceivers 87 at the pieces of equipment. The transceiver 91 has associated therewith a filter or signal-separating unit 92 which separates the various signals from the various transceivers 87 and causes each signal to energize a separate light 86. Thus, depressing the pushbutton 88 on the first transceiver 87 energizes the first part of the light 86 corresponding with that piece of equipment. Depressing the second pushbutton 89 with the same transceiver 87 causes the second part of the same light 86 to be energized. Depressing either of the pushbuttons 88 or 89 with any of the other transceivers 87 causes the first or second portion of the light 86 representative of that piece of equipment to be energized.

In the operation of the present apparatus a dispatcher, is situated so that the entire apparatus is readily viewable by him. For purposes of explanation assume that the present apparatus is being utilized to dispatch concrete trucks. When the dispatcher receives an order for concrete he quickly calculates the number of trucks required to deliver that amount of concrete, the approximate length of time required to drive to the job and the approximate length of time required to unload at the job. He then chooses one of the endless belts 55 which is not being used and designates that job with the number of that endless belt, for example number 9. He then selects a particular truck which is not being used at that time, represented by one of the visual indicators 76, and places it on one of the lights 85. After he has written up the load which the truck will carry he depresses the light 85 to energize it and to remind him that that truck is being loaded. Meanwhile he moves the bar 61 associated with the endless belt designated with the numeral 9 so that the pin 62 is spaced from the wire 56 a distance representative of the time required for the truck to drive to the job. It should be noted at this time that the left end of the bar 61 will be spaced from the left end of the opening 21 a distance representative of the time required for the truck to return to the plant from the job. Upon receiving word that the truck is loaded the dispatcher again depresses the light 85 to deenergize it and moves the visual indicator 76 onto the belt number 9 with the right end of the visual indicator 76 butting against the pin 62 of the bar 61.

As the visual indicator 76 affixed to the belt number 9 moves to the left in the opening 21 it visually represents in terms of time the movement of the truck. When the visual indicator 76 moves under the wire 56 the truck should be at the job and should be unloading. Once the truck has finished unloading the truck driver depresses the pushbutton 88 to light one-half of the light 86 representing his truck. He then begins his journey back toward the plant. When the first portion of the light 86 lights the dispatcher removes the visual indicator 76 from the belt 9 in the area 59 and replaces it on the belt 9 in the area 60 at the left end of the bar 61. When the truck driver is a specified time, such as 5 minutes, from the plant he depresses the pushbutton 89 and the second half of the light 86, representing his truck, is energized. When the dispatcher sees the second half of the light 86 is energized, he checks the position of the visual indicator 76 with respect to the time graduations at the bottom of the opening 21 to determine if his calculations were correct. He then begins preparations for loading the truck a second time and sending it back toward a job.

If several trucks are required on a single job simultaneously the dispatcher calculates the approximate interval of time between trucks so that the trucks will not collect at the job, or anywhere along the way. He then sets the rod 80 associated with the belt 71 of the particular job number, in this example number 9, so that the pin 82 is spaced from the right end of the opening 22 a distance equivalent to the desired interval of time. He selects the visual indicator 78 having the number of the job thereon (number 9) and places it on the belt so that the right end of the visual indicator 78 is aligned with the pin 82. When the visual indicator 78 reaches the right end of the opening 22 the operator knows that the correct interval of time has passed and he must have a second truck, represented by one of the visual indicators 76, loaded and ready to send out on the road. The visual indicator 76 representative of this truck is then placed on the belt 9, in the area 58, so that the right end thereof butts against the pin 62 in the rod 61. The visual indicator 78 is replaced in alignment with the pin 82 and allowed to travel toward the right end of the opening 22. If delays occur anywhere along the way, such as some temporary delay at the loading site, the visual indicator 78 can be moved to the left of the pin 82 a distance equivalent to the delay so that the next truck will be delayed in starting and will not reach the job site until the delay has been remedied. The plurality of indicators 76 provide the dispatcher with a visual representation which enables him to make the most effective decisions for the loading of trucks.

Because the exact position of the trucks is always readily viewable by the dispatcher, he can quickly and easily shift trucks to different jobs or plants, increase or decrease the number of trucks on a job, alter the intervals between trucks at any one job, etc. All information necessary to the dispatcher so that he can most efficiently use all of the equipment is readily available in the most convenient form, that is visual representation. Also, the time required for a truck to travel from the plant to a job and return is indicated on the board and this time is quickly and easily adjustable by the dispatcher, if his initial calculations are slightly erroneous or if some unforeseen obstacle occurs along the way. In addition to the above, other personnel, such as management, can quickly determine the effectiveness of the operation.

FIGS. 11 and 12 illustrate another embodiment wherein similar parts are designated with similar numerals and prime marks are added to all of the numerals to indicate a modification. In this embodiment all four of the rollers 40', 50', 69' and 70', are constructed as the previously described roller 40. To compensate for slight differences in length of the endless belts 55' and 71', apparatus generally designated 95' is utilized. Since similar apparatus is utilized to tighten each of the pluralities of belts 55' and 71', only one apparatus 95' will be described in detail. The apparatus 95' includes an elongated shaft 96' affixed to the upper and lower sides of the frame 20', for limited rotation, by means of bolts or the like. A plate 97' is affixed to each end of the shaft 96' for rotation therewith and each plate 97' has an arcuate slot 98' therein. Bolts are threadedly engaged through the upper and lower sides of the frame 20' and through the arcuate slots 98' to fixedly position the shaft 96' in the desired position. A plurality of spring steel fingers 99' are affixed to the shaft 96', for rotation therewith, in a spaced apart relationship to coincide with the endless belts 55'. Each of the fingers 99' bears against an associated belt 55' to compensate for any variations in length of the belt 55'. Thus, the shaft 96' is loosened and rotated until all of the fingers 99' bear against the belts 55' with sufficient pressure to remove any slack from the belts 55' and the shaft 96' is tightened by means of the bolts at the end thereof and the bolts through the arcuate slots 98', to maintain it fixedly in this position. It should be understood that many other embodiments of devices for compensating for differences in the lengths of the various belts might be utilized and the two described embodiments have been described for exemplary purposes.

Thus, apparatus for correlating information and presenting the correlation in a readily viewable form to a dispatcher or the like has been described. In the described embodiment of the present apparatus the visual indicators 76 and 78 are magnetic and are placed directly on belts formed of magnetic material to greatly decrease or eliminate any possibility of relative movement between the belt and the visual indicator. Further, many other improved visual aids are utilized to greatly increase the efficiency and accuracy of the overall apparatus.

What we claim is:

1. Apparatus for correlating information and presenting the correlation in a readily viewable form comprising:
   a. at least one endless belt formed of magnetic material;
   b. means rotatably mounting said belt with an elongated portion thereof readily viewable by an operator;
   c. drive means attached to said mounting means for driving said belt at a substantially uniform speed;
   d. magnetic visual indicators being constructed for magnetic attachment to said viewable portion of said belt for movement therewith; and
   e. adjustable means positioned adjacent the viewable portion of said belt for indicating the time required to complete various phases of a task with the movement of said visual indicators relative to said adjustable means indicating the approximate state of completion of the various phases of the task.

2. Apparatus as set forth in claim 1 wherein each of said visual indicators represents a piece of equipment and the apparatus includes in addition a plurality of electrically operated indicators controllable by signals transmitted from said pieces of equipment to the apparatus for indicating the actual completion of various phases of the task.

3. Apparatus as set forth in claim 1 including means for defining three areas with the viewable portion of said belt extending through said areas and the adjustable means including an elongated member slidably mounted parallel with and adjacent said viewable portion so as to be at least partially in said three areas with one end of said elongated member indicating the beginning of various phases of the task and amounts of said elongated member lying in at least some of said areas indicating the time required to complete various phases of the task.

4. Apparatus as set forth in claim 1 including in addition means for indicating in terms of time the amount of movement of said visual indicators attached to said belt.

5. Apparatus as set forth in claim 1 wherein a plurality of endless belts are mounted with the viewable portions thereof in parallel juxtaposition.

6. Apparatus as set forth in claim 5 wherein the means rotatably mounting the belts include at least two elongated, axially parallel, spaced-apart rollers, one of which has a resilient material therearound to compensate for small differences in belt lengths.

7. Apparatus as set forth in claim 5 having in addition an elongated member with a plurality of spring biased fingers affixed thereto, one of said fingers being engaged with each of said endless belts to compensate for small differences in belt lengths.

8. Apparatus for correlating information and presenting the correlation in a readily viewable form comprising:
   a. at least one endless belt;
   b. means rotatably mounting said belt with an elongated portion thereof readily viewable by an operator;
   c. drive means attached to said mounting means for driving said belt at a substantially uniform speed;
   d. visual indicators being constructed for engagement and disengagement with the viewable portion of said belt for movement therewith;
   e. means for indicating in terms of time the amount of movement of said visual indicators engaged with said belt;

9. Apparatus for correlating information and presenting the correlation in a readily viewable form comprising:
   a. a first plurality of endless belts;
   b. means rotatably mounting said first belts with an elongated portion of each belt readily viewable by an operator;
   c. drive means attached to said mounting means for driving said first belts at a substantially uniform speed;
   d. visual indicators being constructed for engagement and disengagement with the viewable portions of said first belts for movement therewith;
   e. means defining first, second and third areas with the viewable portions of each of said first belts extending through said areas;
   f. adjustable means positioned adjacent the viewable portions of said first belts and movable in said first and third areas for specifying the amount of movement of said visual indicators attached to said first belts; and
   g. timing means for specifying the distance between visual indicators attached to any one of said first belts.

10. Apparatus as set forth in claim 9 wherein the timing means includes
    a. a second plurality of endless belts;
    b. means rotatably mounting said second belts with an elongated portion of each belt readily viewable by an operator;
    c. drive means attached to said mounting means for driving said second belts at a substantially uniform speed;
    d. visual indicators being constructed for engagement and disengagement with the viewable portions of said second belts for movement therewith; and
    e. adjustable means positioned adjacent the viewable portions of said second belts for specifying the amount of movement of said visual indicators attached to said second belts and for specifying the distance between visual indicators attached to any one of said first belts.

11. Apparatus as set forth in claim 9 wherein the adjustable means includes an elongated member slidably mounted parallel with and adjacent the viewable portion of each of said first belts so as to lie at least partially in the first and third areas with one end of said elongated members indicating the beginning of various phases of tasks and amounts of said elongated members lying in the first and third areas indicating the time required to complete the various phases of the tasks.